(12) United States Patent
Kanade et al.

(10) Patent No.: US 6,373,962 B1
(45) Date of Patent: Apr. 16, 2002

(54) LICENSE PLATE INFORMATION READER DEVICE FOR MOTOR VEHICLES

(75) Inventors: Takeo Kanade, Pittsburgh, PA (US); Taizo Umezaki, Tajimi; Toshio Hamada, Nagoya, both of (JP)

(73) Assignee: Ume Tech Yugen Kaisha, Nagoya (JP)

( * ) Notice: Subject to any disclaimer, the term of this patent is extended or adjusted under 35 U.S.C. 154(b) by 0 days.

(21) Appl. No.: 09/296,606

(22) Filed: Apr. 23, 1999

(30) Foreign Application Priority Data

Apr. 24, 1998 (JP) .......................................... 10-114809

(51) Int. Cl.$^7$ ................................................ G06K 9/00
(52) U.S. Cl. ..................... 382/105; 340/907; 340/933
(58) Field of Search ................................ 382/105, 229, 382/156, 158, 177; 250/338; 340/907, 933; 348/113

(56) References Cited

U.S. PATENT DOCUMENTS

| | | | | |
|---|---|---|---|---|
| 5,651,075 A | * | 7/1997 | Frazier et al. | 382/105 |
| 5,726,450 A | * | 3/1998 | Peterson et al. | 250/338 |
| 6,026,177 A | * | 2/2000 | Mong et al. | 382/156 |
| 6,185,338 B1 | * | 2/2001 | Nakamura | 382/229 |

FOREIGN PATENT DOCUMENTS

| | | |
|---|---|---|
| JP | 2-226479 | 9/1990 |
| JP | 4-242493 | 8/1992 |

* cited by examiner

Primary Examiner—Leo Boudreau
Assistant Examiner—Abolfazl Tabatabai
(74) Attorney, Agent, or Firm—Morgan, Lewis & Bockius LLP (57) ABSTRACT

In a license plate information reader device (A) for motor vehicles, a CCD camera (1) is provided to produce video image data (11) involving a license plate obtained by photographing a front and rear portion of a motor vehicle. An A/D converter (3) produces a digital multivalue image data (31) by A/D converting the video image data (11). A license plate extracting device (4) is provided to produce a digital multivalue image data (41) corresponding to an area in which the license plate occupies. A literal region extracting device (5) extracts a literal positional region of a letter sequence of the license plate based on the image obtained from the license plate extracting device (4). A literal recognition device (6) is provided to recognize a letter from a literal image (571) of the literal positional region obtained from the literal region extracting device (5). An image emphasis device is provided to emphasize the literal image (571) of the literal positional region by replacing a part of the literal region extracting device (5) with a filter net which serves as a neural network.

4 Claims, 8 Drawing Sheets

LICENSE PLATE INFORMATION READER DEVICE FOR MOTOR VEHICLES

BACKGROUND OF THE INVENTION

1. Field of the Invention

The invention relates to an information reader device provided to recognize letters and numbers denoted on a license plate for motor vehicles.

2. Description of Prior Art

In general, a vehicular license plate has a letter sequence indicative of the land transportation agency, a vehicular type classification number, a vehicular distinction letter and a license number. These letters and numbers are a main source to recognize and identify a motor vehicle.

It has been possible to read out the numbers and letters denoted in the license plate by the following procedures.

Detecting the position of the license plate→extracting segments of the letters→recognizing the letters.

In an automatic administration system for motor vehicles in which entrances and exits of motor vehicles are automatically managed at parking lots or toll gates on highways, it is an important technology to accurately extract the letter sequence section from an area in which the license plate occupies in order to ameliorate the literal recognition.

The following procedures have been known to extract the letter sequence section from an area in which the license plate occupies.

(i) The letter sequence is detected based on the information where the license plate is located as disclosed in Laid-open Japanese Patent Application No. 2-226479.

(ii) The license plate is transformed into an image which is then converted into two-value image. Size of connection area of the two-value image is measured to search the corresponding connection area of the letter sequence denoted on the license plate so as to recognize the letter sequence on the license plate as disclosed in Laid-open Japanese Patent Application No. 4-242493.

(iii) Based on the image transformed from the area of the license plate, a histogram is prepared to detect the letter sequence on the license plate.

However, the procedure (i) directly extracts the letter sequence on the license plate only from the information in which the license plate positions without detecting the information based on the letter sequence of the license plate. For this reason, it is feared that the extracted letter sequence would be significantly out of place unless accurately detecting the position of the license plate.

In the procedures (ii) and (iii), prior to treating with the two-value conversion, it is necessary to eliminate the noise caused from a mounting frame, bolts and the like used when securing the license plate to the motor vehicle.

Particularly for a low contrast image and stains on the license plate, it would be difficult to sufficiently distinguish the letter sequence on the license plate from the background of the license plate, thus resultantly deteriorating the accuracy when extracting the letter sequence on the license plate (one of the drawbacks when treating with the two-value conversion).

With the above drawbacks in mind, the present invention has made, it is a main object of the invention to provide a license plate information reader device for motor vehicles which is capable of remaining substantially immune to the peripheral noise caused from the mounting frame, bolts and the like used when securing the license plate to the vehicle, and substantially immune to the image noise caused by the stains and low contrast image on the license plate.

Therefore, it is another object of the invention to provide a license plate information reader device for motor vehicles which is capable of precisely extracting the letter sequence denoted on the license plate so as to attain the literal recognition with a high accuracy.

SUMMARY OF THE INVENTION

According to the present invention, there is provided a license plate information reader device for motor vehicles in which a front and rear portion of an incoming and outgoing motor vehicle is photographed by means of a photographing device so as to produce a video image data including a license plate. An A/D converter transforms the video image data into a digital image data. A license plate extracting device is provided to detect a position in which the license plate occupies so as to extract an image including the license plate. A literal region extracting device is provided to extract a literal positional region of a letter sequence denoted on the license plate based on the image obtained by the license plate extracting device.

Into a part of the literal region extracting device, a filter net is incorporated to serve as a neural network which has learned to emphasize a literal image of the literal positional region previously specified. This extracts only an area in which densely concentrated picture elements occupy among the extracted images including a plurality of image patterns serving as noise components.

With the literal region extracting device thus provided, it is possible to positively extract letters from the literal image of the literal positional region so as to facilitate the literal recognition.

With the filter net used to serve as the neural network in order to emphasize the literal image of the literal positional region, it is possible to remain substantially immune to the peripheral noise caused from the mounting frame, bolts and the like used when securing the license plate to the vehicle, and substantially immune to the image noise caused by the stains and low contrast image on the license plate. This makes it possible to precisely extract the letter sequence denoted on the license plate so as to attain the literal recognition with a high accuracy.

A literal recognition device is provided to recognize the letter from the literal image of the literal positional region obtained from the literal region extracting device. With the neural network used as the literal recognition device which produces a literal code corresponding to an input of the literal image extracted by the literal region extracting device, it is possible for the literal recognition device to produce a correct literal code.

With the filter net incorporated into a part of the literal region extracting device, the filter net learns the literal image including the license plate having a plurality or patterns and the literal regional area corresponding to each digit of the number denoted on the license plate. The filter net produces an output value in correspondence to each of the digits of the literal image of the license plate when the input image data is fed. The literal image of the literal image region is emphasized with a product of the input image data and the output value produced from the filter net.

With the first procedure putting an edge emphasis to a contour area of the obtained image, and further forming a compression image pattern in order to use it to a learning data for the filter net, and with the second procedure putting the edge emphasis to the contour area of the image obtained from the literal region extracting device, and forming a compression image pattern in order to use it for an input pattern fed to the filter net, it is possible to emphasize the literal image region of each of the digits of the literal image of the license plate.

In this instance, putting the edge emphasis makes it possible to extract common features from license plates of different colorations, and the compression image eliminates minor minutia unnecessary for the filter net to learn.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
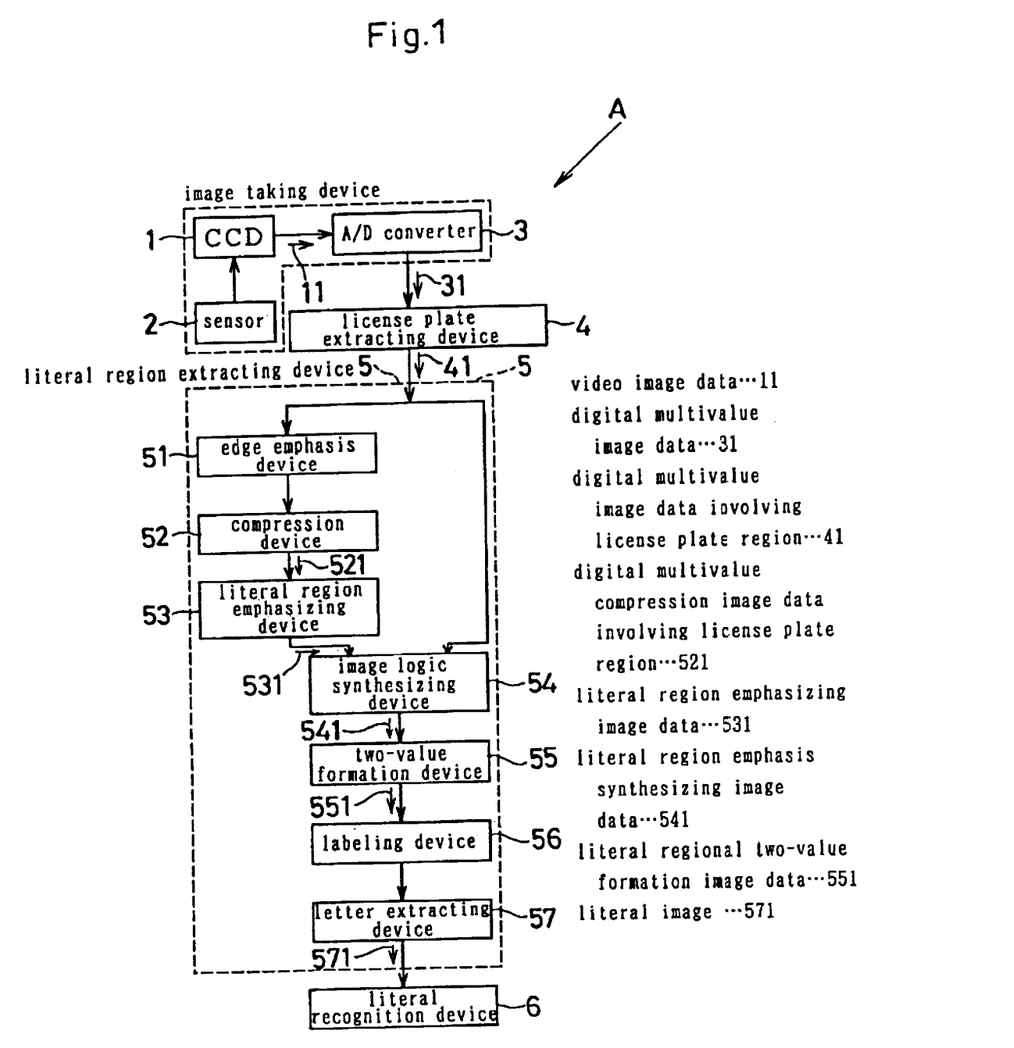
FIG. 1 is a block diagram of a license plate information reader device according to an embodiment of the invention.

Referring to FIG. 1, a license plate information reader device (A) has a CCD camera 1 to photograph a front or rear portion of a motor vehicle. A sensor 2 is provided in an image taking device to measure a distance extending to the motor vehicle. There are also provided an A/D converter 3, a license plate extracting device 4, a literal region extracting device 5 and a literal recognition device 6. The CCD camera 1 is oriented toward an incoming motor vehicle to photograph a front area of the motor vehicle including a license plate so as to produce a video image data 11 which is fed to the A/D converter 3 when the motor vehicle is within a predetermined distance which is measured by the sensor 2. The A/D converter 3 transforms the video image data 11 into digital multivalue image data 31.

When a position of the license plate is detected, the license plate extracting device 4 produces digital multivalue image data 41 (128 dots×64 dots) involving a license plate region through a cutout treatment, an edge extracting treatment, a compression treatment, an output calculation treatment, a coordinate transformation treatment, an addition treatment and a distinction treatment.

Figure 2:
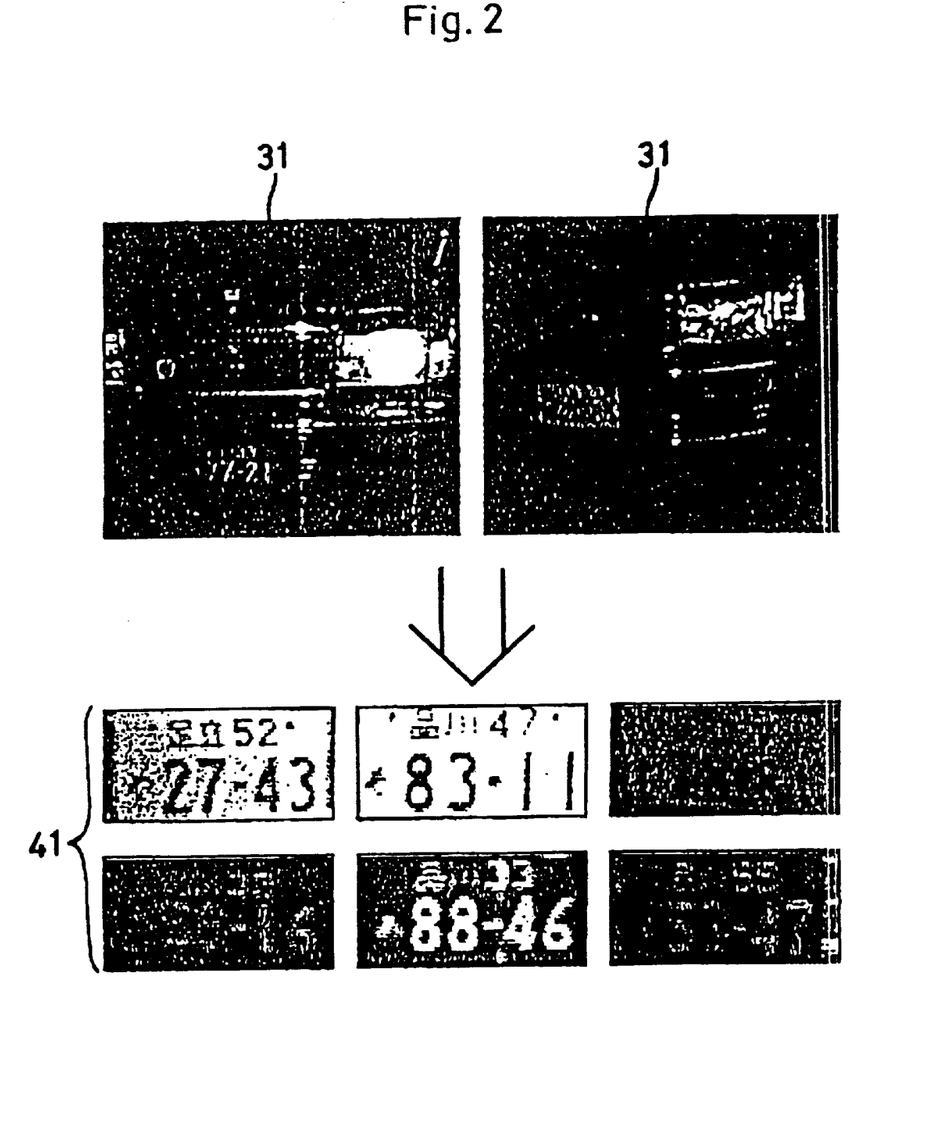
FIG. 2 is explanatory photographs showing how a license plate extracting device obtains digital multivalue image data involving a license plate region among digital multivalue image data.

By way of illustration, from the digital multivalue image data 31, the license plate extracting device 4 attains the digital multivalue image data 41 involving the license plate region as shown in FIG. 2.

The literal region extracting device 5 has an edge emphasis device 51, a compression device 52, a literal region emphasizing device 53, an image logic synthesizing device 54, a two-value formation device 55, a labeling device 56 and a letter extracting device 57.

The edge emphasis device 51 treats the digital multivalue image data 41 with Sobel's transformation (3 dots×3 dots) to emphasize the background of the license plate and a contour area of a letter sequence of the license plate in order to preclude tinged components hued with the license plate.

The compression device 52 implements an image compression treatment to compress the image data (4 dots×4 dots) into "1 dot" in order to eliminate the image noise caused from the photographing procedure, and the minutia noise caused from stains on the license plate.

In this instance, the digital multivalue image data 41 involving the license plate region is transformed from "128 dots×64 dots" to "32 dots×16 dots".

Figure 3:
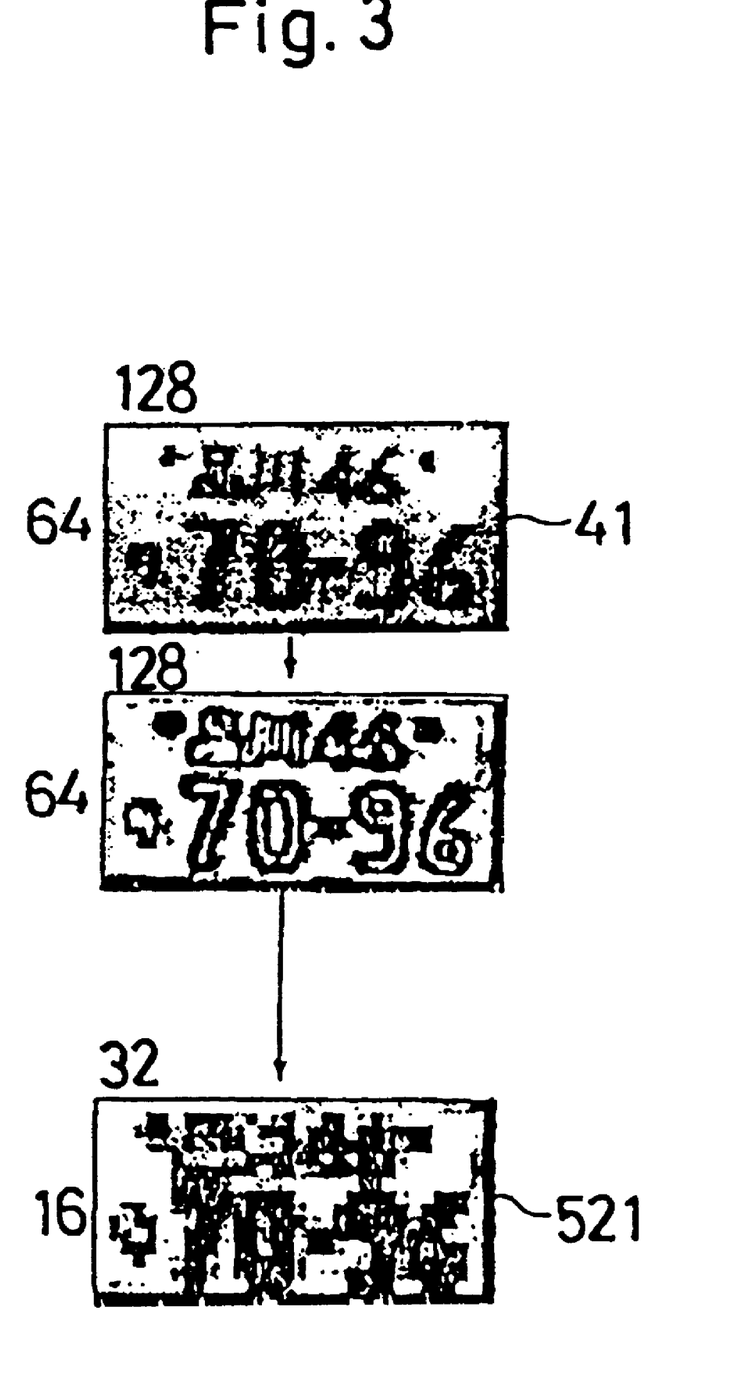
FIG. 3 is explanatory photographs showing how the digital multivalue image data involving the license plate region is put to an edge emphasis treatment and image compression treatment.

Image data are shown in FIG. 3 achieved after the digital multivalue image data 41 involving the license plate region is treated with the edge emphasis device 51 and the compression device 52 so as to obtain digital multivalue compression image data involving the license plate region.

The literal region emphasizing device 53 feeds the digital multivalue compression image data involving the license plate region to a filter net (serving as a neural network) which has learned to emphasize a desired letter sequence region, and extracts only a region having densely concentrated picture elements among a plurality of image patterns including the noise component. This resultantly produces an output image in which the desired letter sequence region is emphasized.

Figure 4:
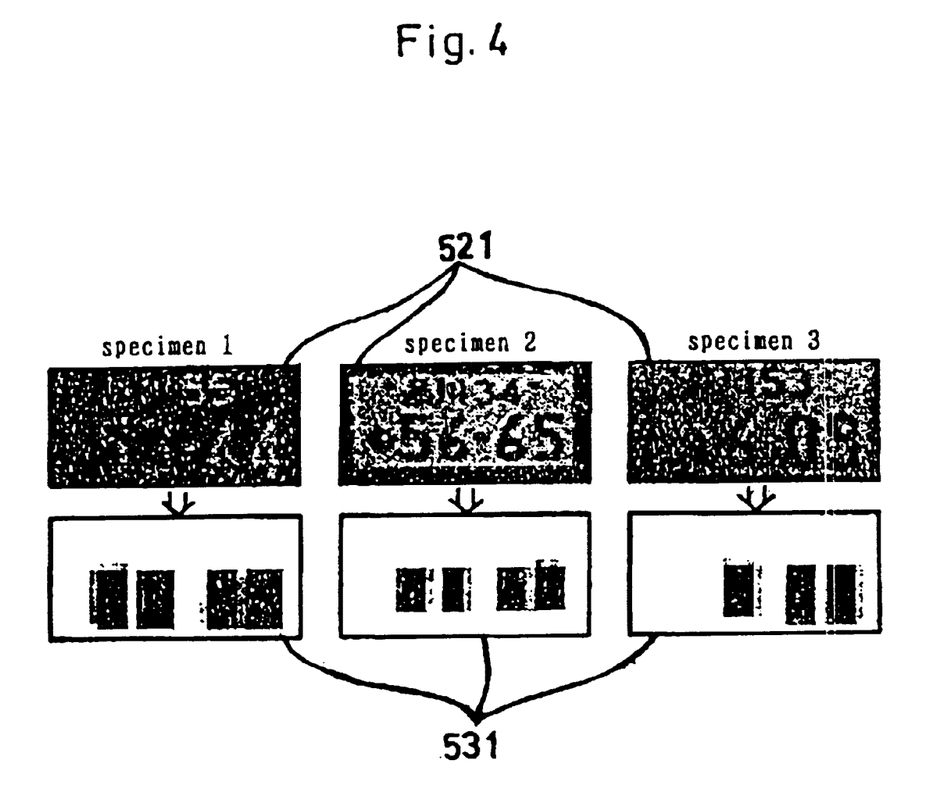
FIG. 4 is explanatory photographs showing how a multivalue compression image data involving the license plate region is emphasized on a literal region emphasis image data corresponding to a vehicular number region by means of a literal region emphasis.

Among the letter sequence denoted on the license plate, a vehicular number region is emphasized. FIG. 4 shows a literal region emphasizing image data 531 regarding to the vehicular number region in which the digital multivalue compression image data 521 involving the license plate region is emphasized by literal region emphasizing device 53.

In the filter net (neural network), each of digits which the vehicular number has up to four corresponds to a single filter net unit. Four filter net units are used herein, each of which has learned to emphasize only a literal image corresponding to the digit of the vehicular number region.

Figure 5:
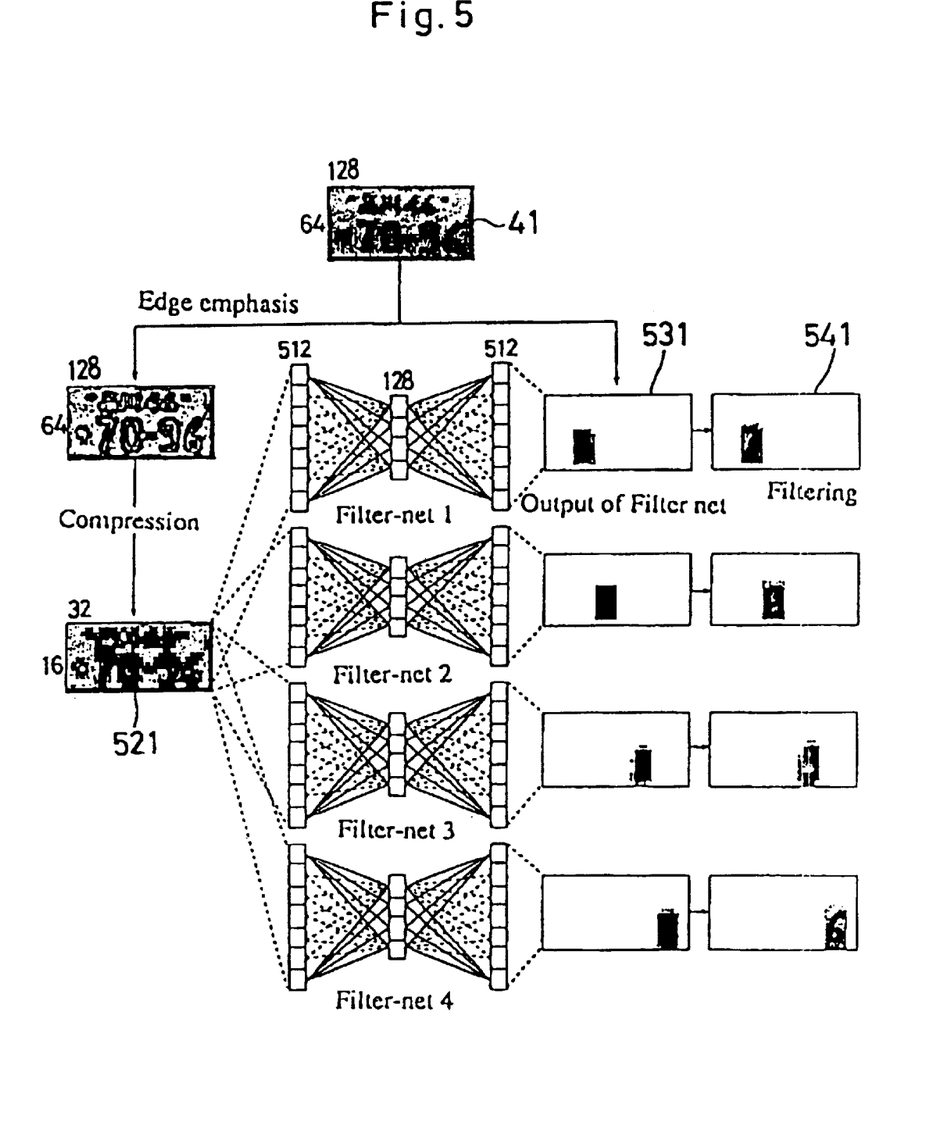
FIG. 5 is an explanatory view of a filter net employed in the embodiment of the invention.

The filter net has three-layered neural network in which a back-propagation method is employed for learning as shown in FIG. 5.

The learning in the filter net is implemented by using the digital multivalue compression image data 521 involving the license plate region which is equivalent to data for twenty motor vehicles. The filter net provides teaching data same the size of learning data in which a rectangular area including the desired letter sequence region is designated as "FFH (sexadecimal)", and the area other than the rectangular area designated as "OOH (sexadecimal)".

When a square error drops to a predetermined proper value or less between the teaching data and the output value generated from the filter net, it is judged that the distinction procedures have ended.

Figure 6:
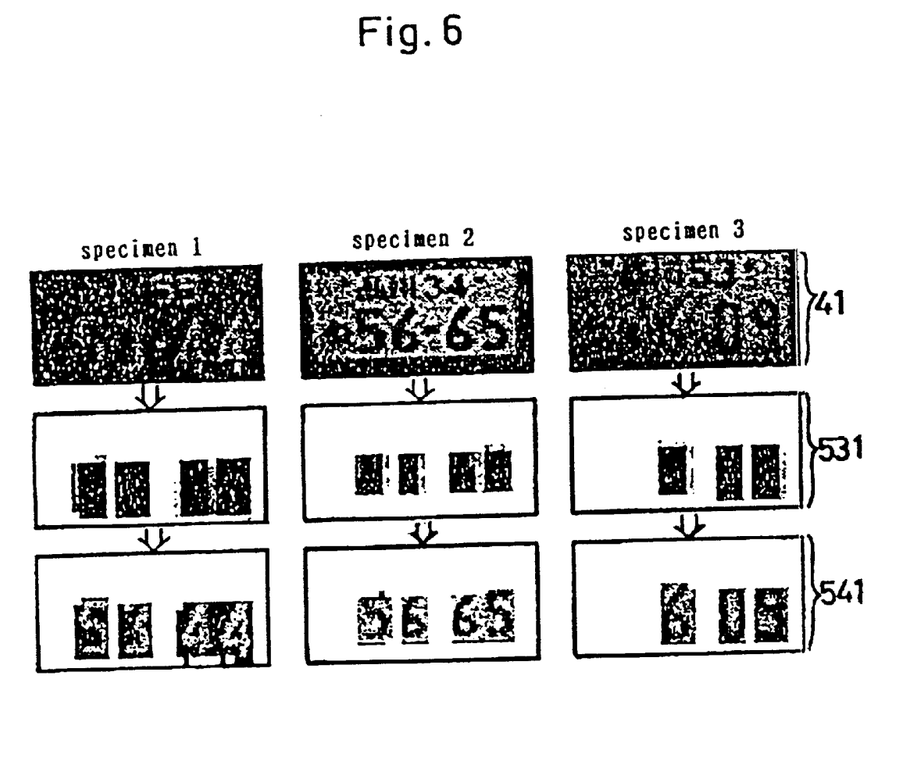
FIG. 6 is explanatory photographs showing how the multivalue image data involving the license plate region is transformed into the literal region emphasis image data of the vehicular number region and a literal region emphasis synthesizing image data by means of an image logic synthesizing device.

In the image logic synthesizing device 54, there stores an image data expanded from "1 dot" to "4 dots×4 dots" on the literal region emphasizing image data achieved by the literal region emphasizing device 53. The image data thus stored is multiplied by the digital multivalue image data 41 attained from the license plate extracting device 4 to represent an logical product of the respective dots-versus-dots to indicate a literal region emphasis synthesizing image data 541 as shown in FIG. 6.

The two-value formation device 55 treats the literal region emphasis synthesizing image data 541 with a two-value formation treatment so as to produce a literal regional two-value formation image data 551.

As a way of two-value formation, a distinction analysis method is employed in which when the concentration histogram derived from the literal region emphasis synthesizing image data 541 is divided into two classes in terms of threshold value (t), a threshold value (t max) is adopted in which a variance between the two classes is maximized. Alternatively, a dynamic threshold determining method may be adopted in which an average image concentration on each of infinitesimal regions is detected consecutively over the entire region so as to achieve a two-value threshold in a row.

The labeling device 56 calculates the number of picture elements in terms of consecutive dark dots (with a bunch of picture elements having "FFH" as a common label) among the literal regional two-value formation image data 551 attained by the two-value formation device 55. When the number of the picture elements is seventy or less, the labeling device 56 judges the picture elements other than the letter sequence, and ignores the picture elements as the noise component. This standard is due to the fact that the least number of the picture elements (seventy two) corresponds to "1" among numerals denoted on the license plate.

The letter extracting device 57 uses a histogram method in which histograms are projected vertically and horizontally respectively in correspondence to output images produced by the labeling device 56. This defines both the up-and-down margin and right-and-left margin on the literal region to extract a literal image of the vehicular number denoted on the license plate.

Figure 7:
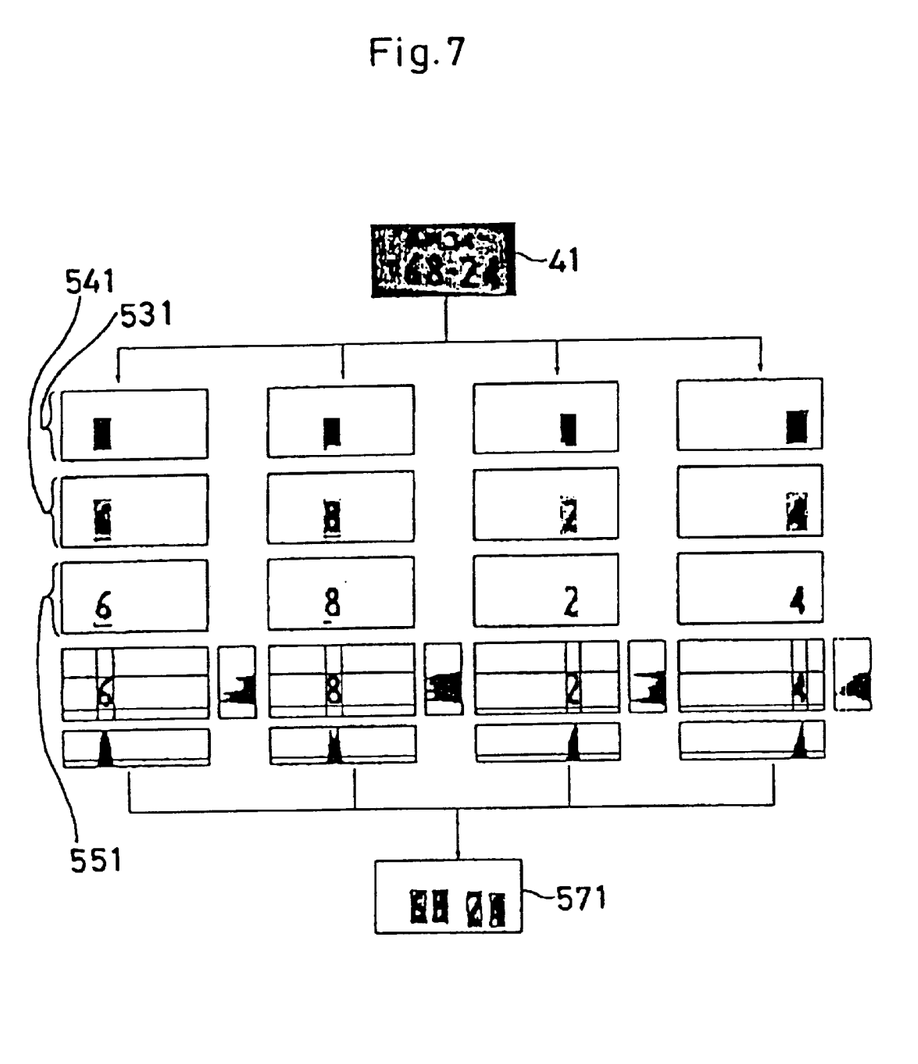
FIG. 7 is explanatory photographs showing how a literal image extracting device obtains a literal image.

In this instance, the size of the literal image extracted by the letter extracting device 57 is "24 dots×12 dots". One example of extracting the literal image is shown in FIG. 7.

Figure 8:
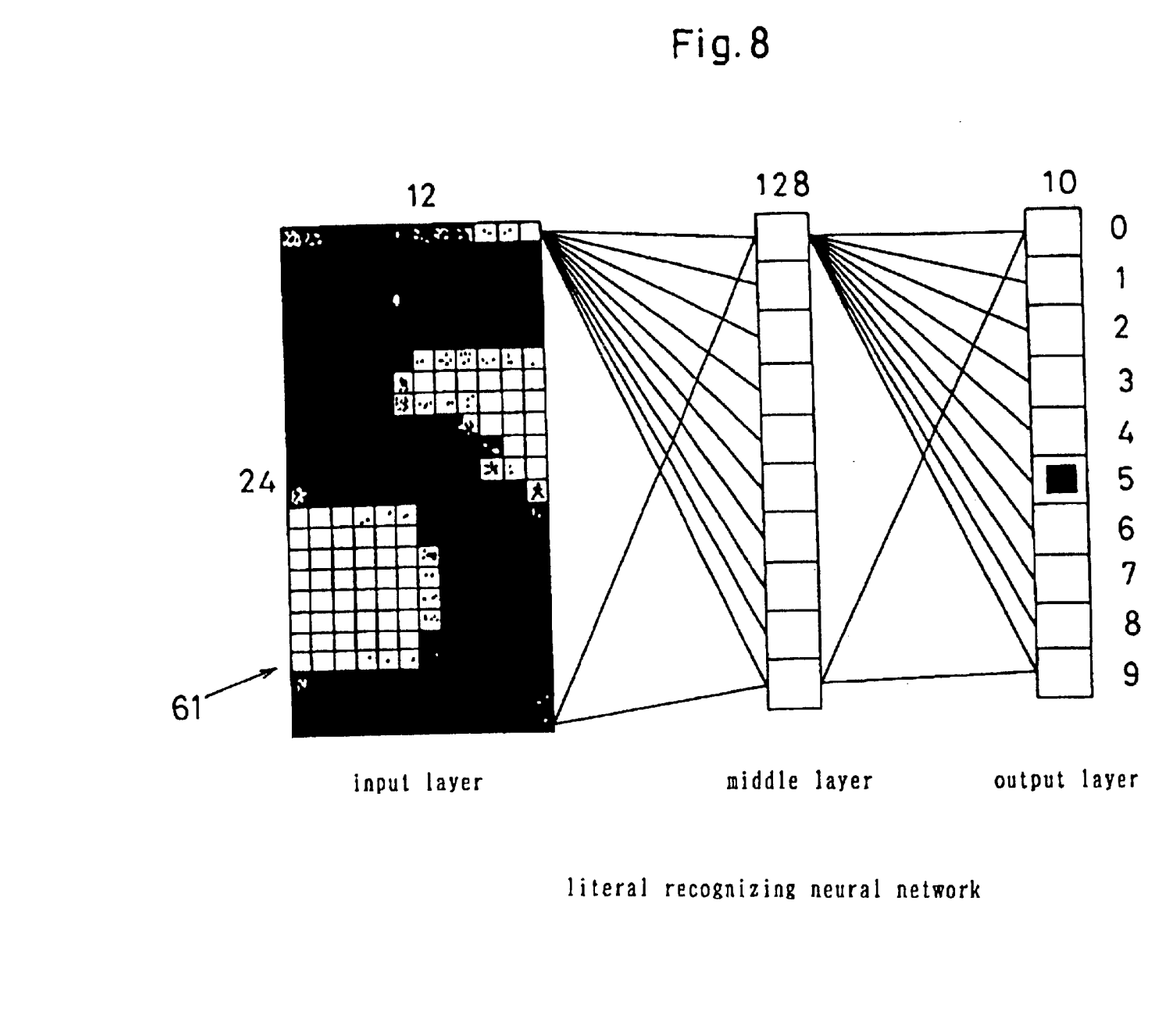
FIG. 8 is a schematic view of a neural network for achieving a literal recognition.

The literal recognition device 6 has a letter recognizing neural network 61 which includes an input layer, a middle layer and an output layer as shown in FIG. 8. The neural network 61 receives a literal image 571 to produce a literal code (e.g., "5" in FIG. 8) corresponding to the literal image 571 received.

As apparent from the foregoing description, it is possible to remain substantially immune to the peripheral noise caused from the mounting frame, bolts and the like used when securing the license plate to the motor vehicle, and substantially immune to the image noise caused by the stains and low contrast image on the license plate. This precisely extracts the letter sequence denoted on the license plate so as to attain the literal recognition with a high accuracy.

MODIFICATION FORMS

With the use of the filter net, it is possible for the literal region extracting device 5 to extract each of the literal regions individually. This makes it possible to implement a search again in view of the results that the other letters are extracted when errors occur during the extracting procedures.

Instead of using the letter recognizing neural network 61 upon recognizing the literal image extracted, it is possible to adopt other letter recognizing methods upon ensuring an accurate recognition since the letter extracting device 57 precisely collates the letters to be collated.

In lieu of the numerals among the letter sequence denoted on the license plate, it is possible to recognize a vehicular type classification number, a vehicular distinction letter and the letter sequence designating the land transportation agency upon implementing the collation.

While there has been described what is at present thought to be preferred embodiments of the invention, it will be understood that modifications may be made therein and it is intended to cover in the appended claims all such modifications which fall within the scope of the invention.

What is claimed is:

1. A license plate information reader device for motor vehicles comprising:

a photographing means provided to produce video image data including a license plate obtained by photographing a front and rear portion of a motor vehicle;

an image taking means having an A/D converter to produce a digital image data by A/D converting the video image data;

a license plate extracting means provided to detect a position of the license plate in the digital image data so as to produce an image including the license plate;

a literal regional extracting means provided to extract a literal position region of a letter sequence of the license plate based on the image obtained from the license plate extracting means;

a literal recognition means provided to recognize a letter from a literal image of the literal positional region obtained from the letter region extracting means;

an image emphasis means provided to emphasize the literal image of the literal positional region by replacing a part of the letter region extracting means with a filter net which serves as a neural network; and the literal recognition means including a letter recognizing neural network which produces a literal code corresponding to the literal image obtained from the letter region extracting means and fed thereto.

2. A license plate information reader device for motor vehicles comprising:

a photographing means provided to produce video image data including a license plate obtained by photographing a front and rear portion of a motor vehicle;

an image taking means having an A/D converter to produce a digital image data by A/D converting the video image data;

a license plate extracting means provided to detect a position of the license plate in the digital image data so as to produce an image including the license plate;

a literal regional extracting means provided to extract a literal positional region of a letter sequence of the license plate based on the image obtained from the license plate extracting means;

a literal recognition means provided to recognize a letter from a literal image of the literal positional region obtained from the letter region extracting means;

an image emphasis means provided to emphasize the literal image of the literal positional region by replacing a part of the letter region extracting means with a filter net which serves as a neural network;

the image emphasis means further comprising:

the literal image having an area including the license plate having a plurality of image patterns;

a filter net which learns the literal image and an area of the letter region corresponding to each of digits of number of the license plate, and the filter net being partly incorporated into the letter region extracting means so as to obtain an output value which the filter net produces in correspondence to each of the digits of the literal image of the license plate when the input image data is fed: and a literal image region being emphasized with a logical product of the input image data and the output value produced from the filter net.

3. A license plate information reader device for motor vehicles comprising:

a photographing means provided to produce video image data including a license plate obtained by photographing a front and area portion of a motor vehicle;

an image taking means having an A/D converter to produce a digital image data by A/D converting the video image data;

a license plate extracting means provided to detect a position of the license plate in the digital image data so as to produce an image including the license plate;

a literal regional extracting means provided to extract a literal positional region of a letter sequence of the license plate based on the image obtained from the license plate extracting means;

a literal recognition means provided to recognize a letter from a literal image of the literal positional region obtained from the letter region extracting means;

an image emphasis means provided to emphasize the literal image of the literal positional region by replacing a part of the letter region extracting means with a filter net which serves as a neural network;

the literal recognition means including a letter recognizing neural network which produces a literal code corresponding to the literal image obtained from the letter region extracting means and fed thereto; and the image emphasis means further comprising:
  the literal image having an area including the license plate having a plurality of image patterns;
  a filter net which learns the literal image and an area of the letter region corresponding to each of digits of number of the license plate, and the filter net being partly incorporated into the letter region extracting means so as to obtain an output value which the filter net produces in correspondence to each of the digits of the literal image of the license plate when the input image data is fed; and
  a literal image region being emphasized with a logical product of the input image data and the output value produced from the filter net;
  the literal image region of each of the digits of the literal image of the license plate being emphasized by providing first means which puts an edge emphasis to a contour area of the obtained image, and further forming a compression image pattern in order to use it to learning data for the filter net; and
  second means which puts the edge emphasis to the contour area of the image obtained from the letter region extracting means, and forming a compression image pattern in order to use it for an input pattern fed to the filter net.

4. A license plate information reader device for motor vehicles comprising:

a photographing means provided to produce video image data including a license plate obtained by photographing a front and rear portion of a motor vehicle;

an image taking means having an A/D converter to produce a digital image by A/D converting the video image data;

a license plate extracting means provided to detect a position of the license plate in the digital image data so as to produce an image including the license plate;

a literal regional extracting means provided to extract a literal positional region of a letter sequence of the license plate based on the image obtained from the license plate extracting means;

a literal recognition means provided to recognize a letter from a literal image of the literal positional region obtained from the letter region extracting means;

an image emphasis means provided to emphasize the literal image of the literal positional region by replacing a part of the letter region extracting means with a filter net which serves as a neural network;

the literal recognition means including a letter recognizing neural network which produces a literal code corresponding to the literal image obtained from the letter region extracting means and fed thereto;

the image emphasis means further comprising:
  the literal image having an area including the license plate having a plurality of image patterns;
  a filter net which learns the literal image and an area of the letter region corresponding to each of digits of number of the license plate, and the filter net being partly incorporated into the letter region extracting means so as to obtain an output value which the filter net produces in correspondence to each of the digits and the literal image of the license plate when the input image data is fed; and
  a literal image region being emphasized with a logical product of the input image data and the output value produced from the filter net.

* * * * *